United States Patent [19]

Rung et al.

[11] Patent Number: 4,643,224

[45] Date of Patent: Feb. 17, 1987

[54] ALARM TEST DEVICE FOR A SPRINKLER SYSTEM

[75] Inventors: Robert Rung, Hopatcong, N.J.; Philip R. Schwarz, Easton, Pa.

[73] Assignee: Victaulic Company of America, Easton, Pa.

[21] Appl. No.: 772,993

[22] Filed: Sep. 4, 1985

[51] Int. Cl.⁴ .............................................. F16K 37/00

[52] U.S. Cl. .................................... 137/559; 137/599; 137/625.3; 137/625.32; 137/876; 251/118; 116/276

[58] Field of Search ............ 137/559, 599, 883, 625.3, 137/625.31, 625.32, 876; 251/118; 116/276

[56] References Cited

U.S. PATENT DOCUMENTS

| | | | |
|---|---|---|---|
| 1,482,848 | 2/1924 | Johnson | 137/559 X |
| 2,602,699 | 7/1952 | Otto et al. | 137/559 X |
| 2,869,815 | 1/1959 | Jordan | 137/559 X |
| 3,477,467 | 11/1969 | Sewell et al. | 137/599 |
| 3,893,473 | 7/1975 | Breece | 137/559 X |
| 4,022,245 | 5/1977 | Davis | 137/559 |
| 4,199,006 | 4/1980 | Thalhamer | 137/599 |
| 4,374,785 | 2/1983 | Wyatt | 137/599 X |

*Primary Examiner*—Alan Cohan
*Assistant Examiner*—John A. Rivell
*Attorney, Agent, or Firm*—Abelman Frayne Rezac & Schwab

[57] ABSTRACT

An alarm test device for a sprinkler system incorporates test and drain valves, together with a sight glass and a metering orifice into a single test valve, with the option of employing a plug valve as the test and drain valves, and the further option of employing a combined sight glass and metering orifice as the plug valve.

5 Claims, 8 Drawing Figures

FIG. 3
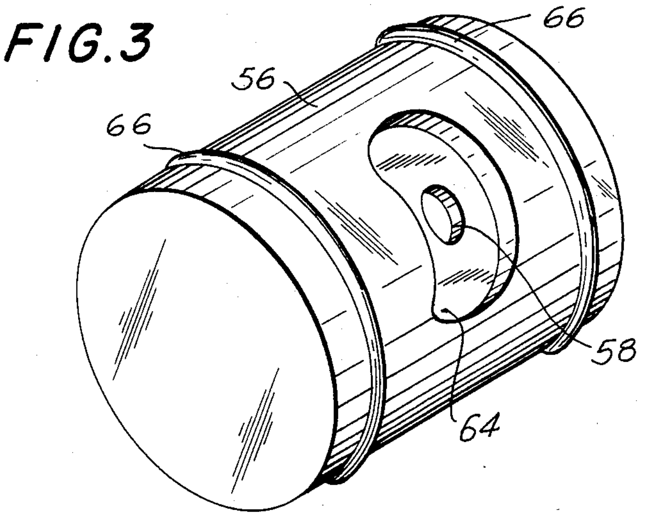
FIG. 4
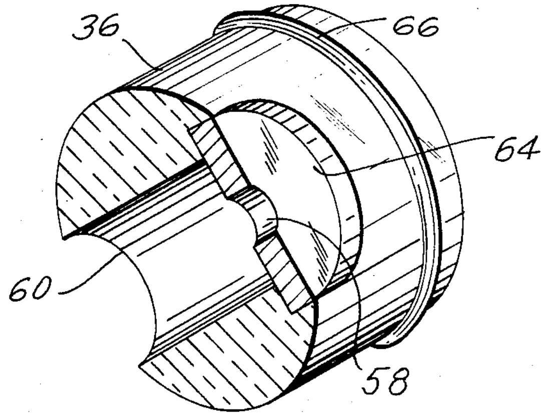
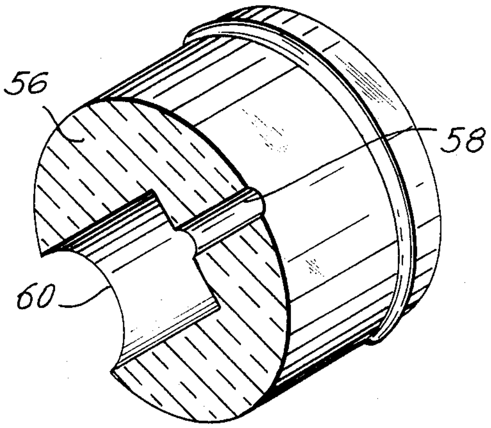
FIG. 5

ALARM TEST DEVICE FOR A SPRINKLER SYSTEM

FIELD OF THE INVENTION

This invention relates to a device for use in testing a hydraulic system, and in particular, to a device for testing the operability of an alarm associated with a fire extinguishing sprinkler system.

BACKGROUND OF THE INVENTION

Fire extinguishing sprinkler systems require that the system be tested periodically in order to prove the operability of the system, and, in particular to prove the operability of an alarm associated with the sprinkler system.

The alarm is provided in order to give an audible or visual warning that one or more of the sprinkler heads of the system have been activated, either accidentally, or in response to an existing fire condition, and is triggered by a water flow actuated switch positioned upstream of the sprinkler heads in the feed main to the sprinkler heads.

The water flow actuated switch is set for it to close at a flow rate in the feed main corresponding with, or not greater than, that produced by the actuation of a single one of the sprinkler heads.

As clearly, the activation of one of the sprinkler heads in order to test the system is not a viable method of testing the system, a separate test circuit must be provided in order to prove the water flow switch and to prove the alarm.

Such test circuits are well known in the art, and are comprised of an assemblage of fittings and interconnecting pipes providing a serial arrangement of a test valve connected to the feed main, a sight glass, and a connection from the metering device to a drain line. In addition, such test circuits include a separate drain line connected between the feed main and the drain line, and which is controlled by a drain valve independent of the test valve.

Thus, no fewer than nine separate fittings and nine separate lengths of threaded pipe are required in the assembly of a typical test circuit such as is in common usage, this producing a requirement for no less than twenty one separate threaded joints to be assembled in constructing the test circuit.

SUMMARY OF THE INVENTION

It is an object of this invention to provide a test device which incorporates all of the functions of the known test circuit into a single integrated unit, and which provides all of the required fittings as integers of the single pre-assembled unit.

According to the present invention, the test and drain valves are incorporated into a single unitary valve body, which also incorporates the required sight glass and metering device as a single unitary sub-assembly.

In this manner, the only connections required for the assembly of the entire test system is a connection of the valve body from the feed main, and a connection from the valve body to the drain line.

Preferably the sub-assembly of sight glass and metering device is that disclosed in co-pending application Ser. No. 772,871, filed Sept. 4, 1985, the entire disclosure of which is included herein by direct reference.

Additionally, the test and drain valves can be provided by the sight glass and metering device itself, acting as a three-way plug valve, in this way eliminating the requirement for independent valves to provide those functions.

DESCRIPTION OF THE DRAWINGS

The invention will now be described with reference to the accompanying drawings which illustrate preferred embodiments of the invention, and in which:

FIG. 3 is a perspective view of a combined sight glass and metering orifice included in the alarm test device of FIG. 2;

FIG. 4 is a fragmentary perspective view corresponding with FIG. 3, and illustrating the metering orifice and a cavitation chamber included in the metering sight glass of FIG. 3;

FIG. 5 is a view corresponding with FIG. 4, but illustrating an alternative and simplified construction of the metering sight glass of FIG. 3;

DESCRIPTION OF THE PREFERRED EMBODIMENTS

Before discussing the preferred embodiments as illustrated in FIGS. 2 through 8, the known construction of alarm test system will be discussed as related to FIG. 1 of the drawings.

THE PRIOR ART

Figure 1:
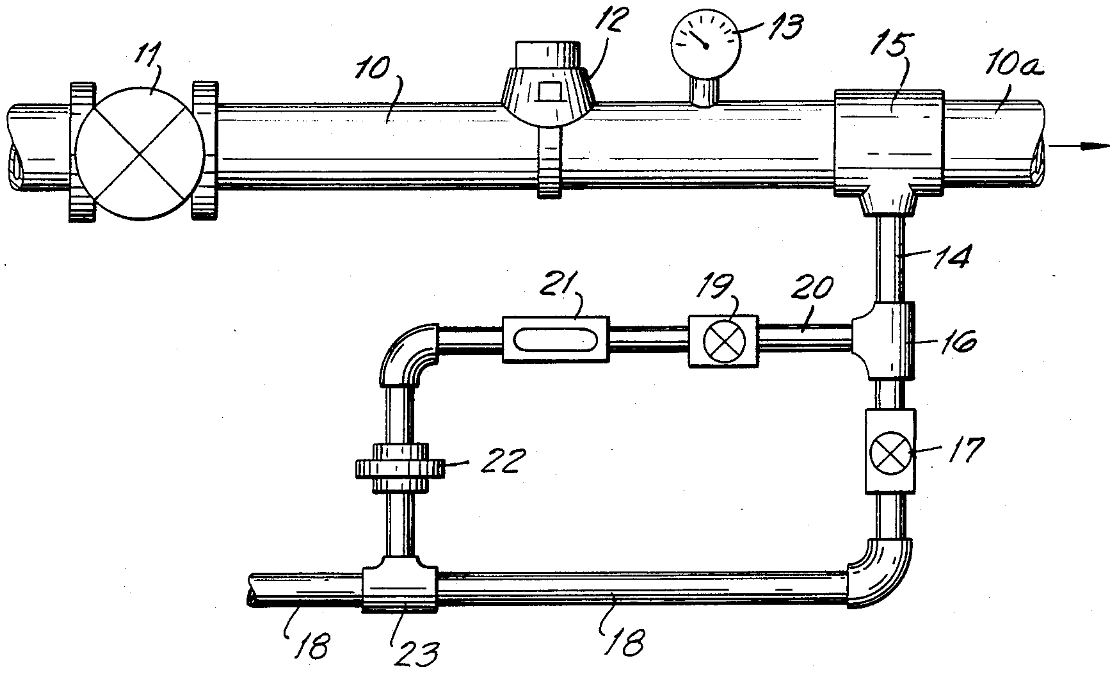
FIG. 1 PRIOR ART
FIG. 1 is labelled "PRIOR ART", and is an illustration of a typical test system such as is commonly known in the art.

In FIG. 1 the feed main is shown at 10, the feed main being controlled by a main valve 11. The sprinkler heads (not shown) are connected to the downstream end 10*a* of the feed main.

Downstream of the main valve 11 and coupled with the feed main 10, is a water flow switch 12, which is actuated by water flow in the feed main 10, and is connected to actuate an alarm (not shown). The water flow switch 12 is set to close when there is a flow in the feed main corresponding with the opening of a single one of the smallest sprinkler heads connected to the branch.

A pressure gage 13 may be provided for indicating static water pressure in the feed main 10, and for indicating a pressure drop resulting from the opening of one or more of the sprinkler heads.

A test line 14 is connected to the feed main 10 by means of a T-branch 15. The test line 14 is in turn connected to a drain valve 17 by way of a T-branch 16, and is in turn connected to a drain line 18.

The T-branch 16 also connects with a test valve 19 in a test line 20, in which are serially arranged the test valve 19, a sight glass 21, and a metering device 22 incorporating a disc having a metering orifice positioned within a union. The test line 20 terminates in a T-branch 23 providing a connection with the drain line 18.

In order to test the water flow switch 12, and prove the alarm system, the test valve 19 is opened to permit a flow of water through the sight glass 21 and through the metering orifice 22, the metering orifice acting to restrict the flow to that which would occur upon the opening of a single smallest sprinkler head.

The sight glass 21 is provided, more particularly, in order that water flow through the test line 20 can be confirmed, there being the possibility that the test valve 19 is defective, or, the metering orifice is blocked or partially blocked, or, that the drain line 18 itself is blocked. Any one of these conditions would give a faulty test indication leading to the conclusion that the water flow switch 12 is defective, or, that the alarm is defective.

In addition, National Fire Protection Association regulations require that a sight glass be provided if the inspector cannot observe the water flow through the test loop portion flowing into an open drain upon opening the test valve.

Over extended periods of time, the sight glass 21 will become dirty or clouded, this making it difficult to read, and, making it difficult to differentiate between an empty sight glass and one which is filled with a solid core of water. Further, the transition between the empty and full conditions of the sight glass is almost instantaneous, and can be missed by the person making the test.

THE PREFERRED EMBODIMENTS

Figure 2:
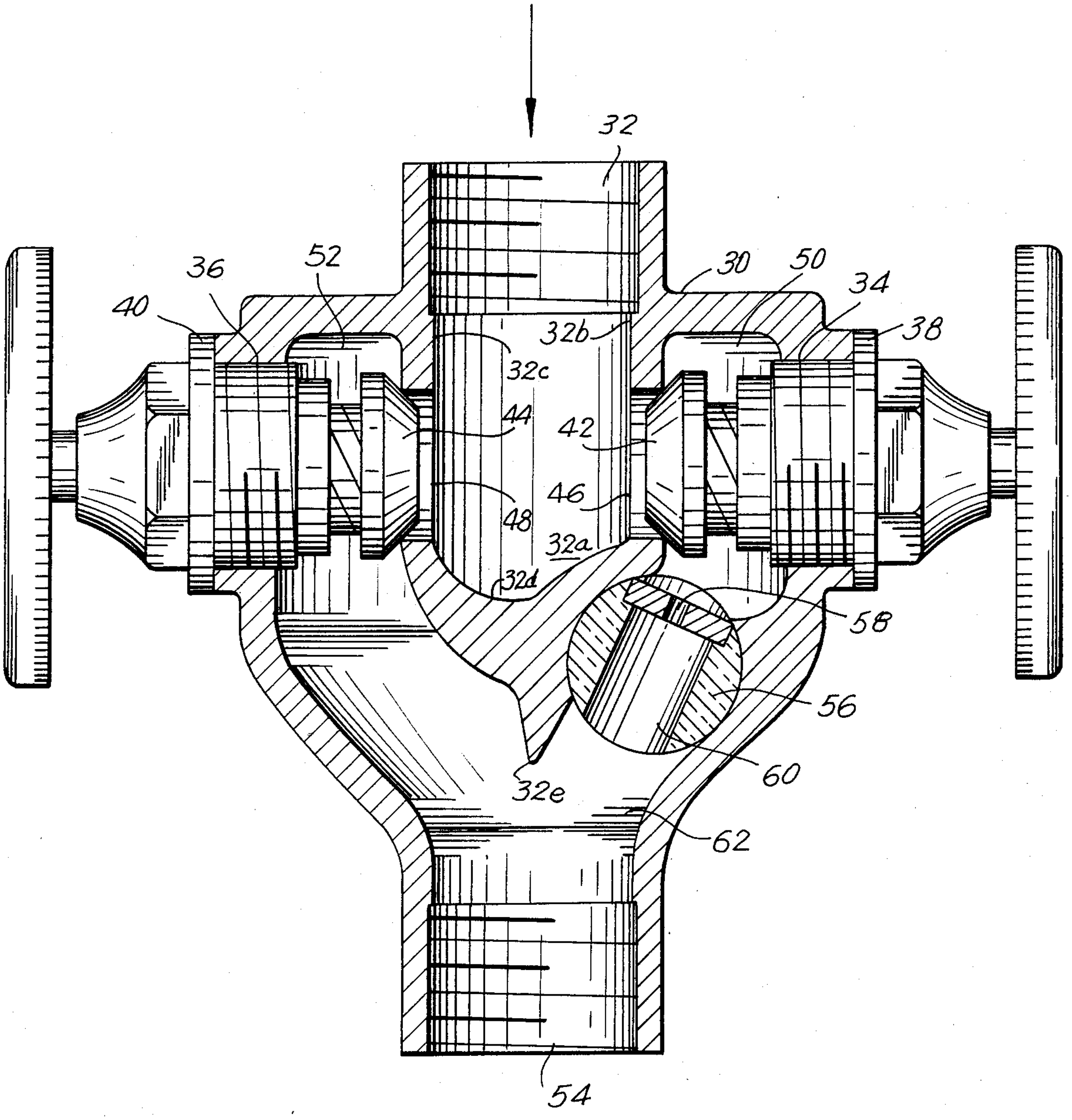
FIG. 2 is a transverse cross-section through an alarm test device according to the present invention.

Referring now to FIG. 2, one form of alarm test device according to the present invention includes a valve body 30, having a threaded inlet 32 by means of which the test device can be connected to the feed main of the sprinkler system.

The threaded inlet 32 continues inwardly of the valve body 30 to form a closed chamber **32*a* having substantially parallel opposite side walls 32*b* and 32*c*, and an end closure wall 32*d***.

Laterally of the threaded inlet opening, the valve body 30 is provided with oppositely extending threaded openings 34 and 36, within which conventional valve spindles 38 and 40 having valve member 42, 44 are received. The respective valve members 42 and 44 cooperate with valve seats 46 and 48 provided in the opposite parallel side walls **32*b* and 32*c* of the threaded inlet 32**.

The valve spindle 38 and its associated valve member 42 and the valve seat 46 provide the required test valve of the system. The valve spindle 40 and its associated valve member and valve seat 48 provide the required drain valve of the system.

The valve seat 46 opens into a cavity 50 providing the test line of the device. The valve seat 48 opens into a cavity 52 providing the drain line of the device, the cavity 52 being connected directly to a threaded outlet 54 common to both the test line and the drain line.

Positioned within the cavity 50, and extending transversely thereof is a metering sight glass 56 of the type disclosed in co-pending application Ser. No. 772,871, filed Sept. 4, 1985. The sight glass 56 is formed from a solid cylinder of a transparent glass-like material, and includes a transverse metering orifice 58, and, immediately adjacent thereto, a cavitation chamber 60. As is disclosed in the said copending application, the ends of the metering sight glass 56 extend through the valve body 30 for the ends of the metering sight glass to be exposed to direct view, whereby, the cavitation chamber can be viewed directly from either axial end of the sight glass 56. Optionally, the metering orifice can be configured to provide a divergent spray at the outlet thereof, as taught in the said copending application.

Integral with the end closure wall **32*d* of the inlet 32 is a flow diverter 32*e*, which directs flow from either source toward the threaded outlet 54**.

The valves 38 and 40 normally are in their closed position, such that there can be no flow of water from the inlet 32 to a drain line connected to the outlet 54.

If it is desired to drain the system, then, the valve 40 is opened, giving free access from the threaded inlet 32 to the threaded outlet 54.

If it is desired to test the water flow valve and alarm of the system, then, the valve 38 is opened, permitting water to pass from the threaded inlet 32 into the cavity 50. The sight glass 56 is arranged in contact with the side walls of the cavity 50, thus preventing any appreciable flow of water around the sight glass, the flow being restricted to a flow through the metering orifice 58.

On discharging from the metering orifice 58, the issuing stream of water is subjected to cavitation within the cavitation chamber 60, due to the abrupt pressure drop and the release of air entrained or dissolved in the water flow.

The discharge of the metered flow through the metering orifice can readily be observed through either end of the sight glass 56 at any time during the test run, the presence of the cavitated water in the cavitation chamber 60 being readily distinguishable from an absence of water flow, or, from a solid core of water.

It will be seen that by the teachings of the invention, all integers of the prior art test and drain system of FIG. 1 have been incorporated into a relatively small unitary device which is readily connectable to the feed main and to the drain line by making only two threaded connections.

Referring now more particularly to FIGS. 3 and 4, the metering sight glass 56 is in the form of a cylinder having grooves adjacent its ends for the receipt of O-rings 66, the metering orifice 58 being provided in a plate 64 inserted into the sight glass 56, and which is replaceable by another plate having a metering orifice 58 of different dimensions. In this manner, the alarm device of FIG. 2 readily can be accommodated to any particular type of sprinkler head, merely by removing the sight glass 56 axially from the valve body 30, substituting a plate 64 having an appropriate metering orifice 58, and then reinserting the sight glass 56 into the valve body 30 and locking it into position. This conveniently can be done by means of a pin (not shown) threaded into the valve body 30 and which is engaged in a recess in the sight glass 56, thus serving to correctly orient the flow passages of the glass relative to the valve body.

FIG. 5 illustrates a modification of the sight glass of FIG. 2 in fragmentary perspective view, in which metering orifice 58 being formed directly in the body of the metering sight glass.

Figure 6:
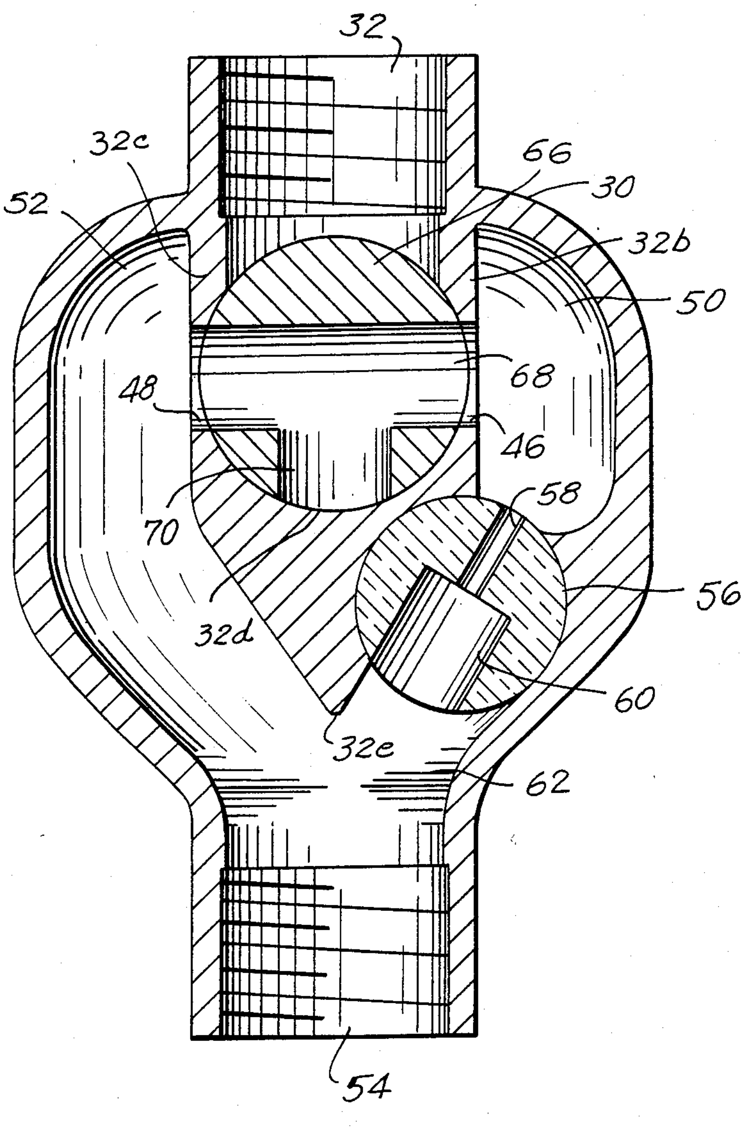
FIG. 6 is a cross-section through an alternative form of alarm test device according to the present invention.

Referring now to FIG. 6, an alternative construction of test device is illustrated, the same reference numerals having been employed in FIG. 6 to identify those members that are in common with FIG. 2.

In FIG. 6, the valve spindles 38 and 40 are omitted in their entirety, and, are replaced by a rotatable plug or ball valve 66 extending transversely of the threaded inlet 32 and cooperating with the opposite side walls **32*b* and 32*c* of the threaded inlet. While not absolutely necessary, the end closure wall is modified for it to support and position the plug valve 66. The plug valve 66 cooperates with valve seats 46 and 48 similar to those described with reference to FIG. 2**.

The plug valve 66 is provided with a through passage 68 and a lateral passage 70, the plug valve 66 being rotatable within the valve body 30 by a manually actuable handle (not shown) exterior of the valve body 30.

The position of the plug valve 66 corresponds with the closed position of the test valve. Upon rotation of the plug valve 66 through 90 degrees in a clockwise direction, the plug valve then responds as a drain valve, permitting water to drain from the inlet 32 through the passage 66 and laterally out of the passage 70 and through the valve seat 48 for it to be discharged through the outlet 54.

Upon rotation of the plug valve 66 by 90 degrees in a counterclockwise direction, then, the test passage 50 is connected with the inlet 32 via the through passage 68 in the plug valve and the lateral passage 70, for the device to function in exactly the same manner as that discussed above with respect to FIG. 2.

Figure 7:
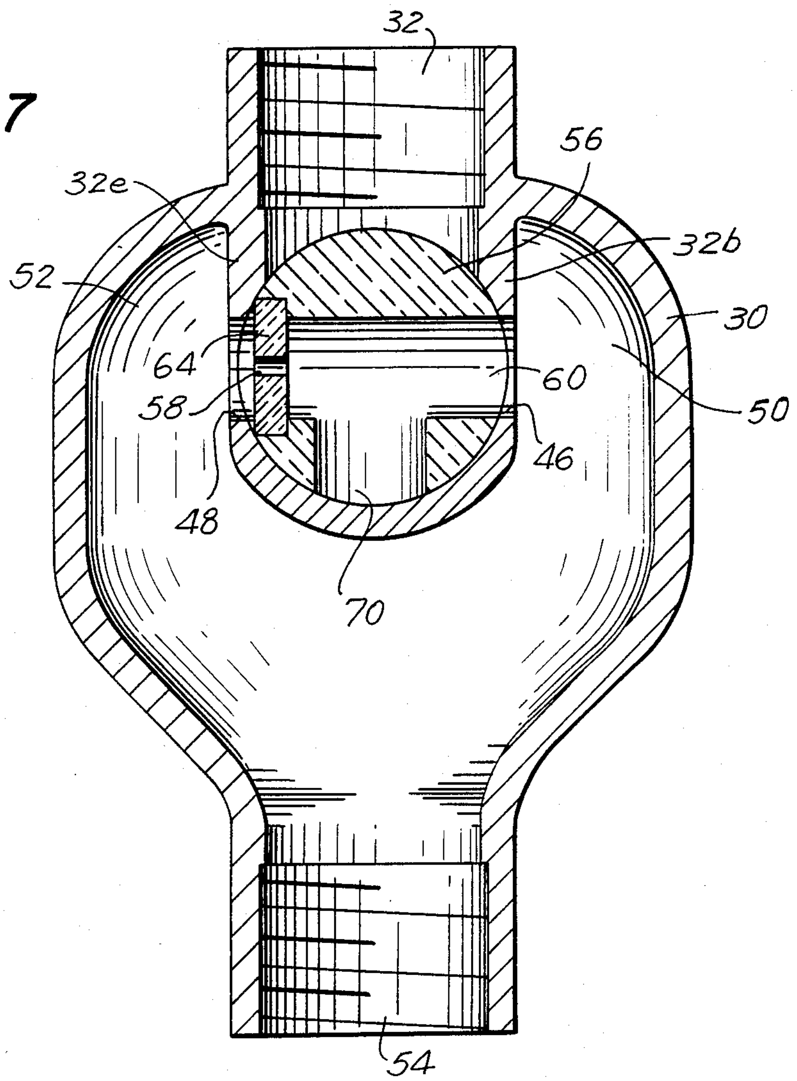
FIG. 7 is a transverse cross-section through another form of alarm test device according to the present invention; and, FIG. 8 is a transverse cross-section through still another form of alarm test device according to the present invention.

As illustrated in FIG. 7, an even further reduction of the inventive concept can be made by employing the metering sight glass 56 itself in substitution for the plug valve 66 of FIG. 6. In FIG. 7, the sight glass 56 is arranged to extend through the valve body 30 and be open at its respective ends for ready viewing of the cavitation chamber 60. The metering sight glass 56, as discussed above with respect to FIG. 6, is provided with a manually operable handle whereby the metering sight glass can be rotated 90 degrees in either a clockwise or counter-clockwise direction, in order to provide exactly the same results as those discussed above with respect to FIG. 6. The cavitation of the metered flow within the cavitation chamber 60, is observable from either end of the sight glass 56.

Figure 8:
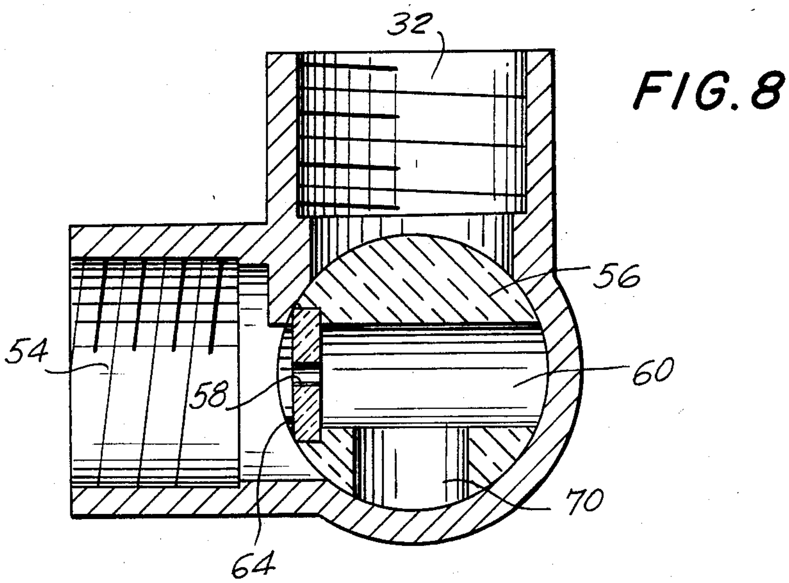

An even further reduction of the inventive concept is illustrated in FIG. 8, in which the respective valve seats 46 and 48 previously shown in FIGS. 2, 6 and 7 are provided directly within the inlet 32 and the outlet 54, the inlet and outlet being arranged at 90 degrees to each other, instead of being axially aligned with each other.

In FIG. 8, rotation of the sight glass 56 through 90 degrees will act to position the metering plate 64 and metering orifice 58 in direct communication with the inlet 32, the discharge from the cavitation chamber 60 being laterally through the passage 70, and directly into the outlet 54. In this mode, the valve operates as a test valve.

Continued rotation of the sight glass 56 through 90 degrees in the same direction will then bring the lateral passage 70 into direct communication with the inlet 32, while at the same time bringing the cavitation chamber 60 into direct communication with the outlet 54. In this mode, the valve operates as a drain valve.

It will be appreciated that various further modifications may be made in the preferred structure without departing from the scope of the invention as defined in the following claims.

We claim:

1. An alarm test module for a fire extinguishing sprinkler system, including in combination:

a unitary valve body providing an inlet, an outlet, and at least one valve seat communicating said inlet with said outlet;

a sight glass in the form of a solid cylinder of transparent material extending transversely through said valve body and exposed at opposite end viewing surfaces located externally of said valve body, said sight glass being interposed between said inlet and said outlet and having a metering passage extending diametrically therethrough providing for controlled communication of said inlet with said outlet; and, valve means cooperating with said at least one valve seat for selectively connecting said inlet directly to said outlet, for selectively connecting said inlet to said outlet via said metering orifice, and for selectively isolating said inlet from said outlet.

2. The alarm test device of claim 1, including dual said valve seats, and dual valve members providing said valve means, the respective said valve members being associated with one of said valve seats, said valve members being operable independently of each other.

3. The alarm test device of claim 1, including dual said valve seats, said at least one valve member cooperating with said valve seats and being operative to selectively close said valve seats.

4. The alarm test device of claim 3, in which said at least one said valve member is a rotatable plug valve operative in one angular position of rotation to isolate said inlet from said outlet, and in another angular position to communicate said inlet directly with said outlet, in another angular position to communicate said inlet with said outlet via said combined metering orifice and sight glass.

5. The alarm test device of claim 3, in which said at least one valve member is a rotatable plug valve comprised of said combined metering orifice and sight glass, and operative in one angular position of rotation to isolate said inlet from said outlet, and in another angular position of rotation to connect said inlet with said outlet, and in another angular position of rotation to connect said inlet with said outlet via said metering orifice.

* * * * *